(12) United States Patent
Hartmann et al.

(10) Patent No.: US 7,624,989 B2
(45) Date of Patent: Dec. 1, 2009

(54) SEAL WITH NON-CONTACT ADJACENT DEFLECTOR RINGS

(75) Inventors: Erwin Hartmann, Bergrheinfeld (DE); Wilhelm Walter, Kronungen (DE)

(73) Assignee: Schaeffler KG, Herzogenaurach (DE)

( * ) Notice: Subject to any disclaimer, the term of this patent is extended or adjusted under 35 U.S.C. 154(b) by 117 days.

(21) Appl. No.: 10/596,518

(22) PCT Filed: Dec. 3, 2004

(86) PCT No.: PCT/DE2004/002654

§ 371 (c)(1), (2), (4) Date: Aug. 16, 2006

(87) PCT Pub. No.: WO2005/059412

PCT Pub. Date: Jun. 30, 2005

(65) Prior Publication Data

US 2007/0085276 A1 Apr. 19, 2007

(30) Foreign Application Priority Data

Dec. 16, 2003 (DE) .............................. 103 58 876

(51) Int. Cl.
*F16J 9/00* (2006.01)
*F16J 15/40* (2006.01)

(52) U.S. Cl. ....................... 277/346; 277/347; 277/349; 277/412; 277/418

(58) Field of Classification Search ................ 277/346, 277/347, 349, 411, 412, 418–420
See application file for complete search history.

(56) References Cited

U.S. PATENT DOCUMENTS

| | | | | | |
|---|---|---|---|---|---|
| 2,245,281 | A | * | 6/1941 | Klopak | 277/419 |
| 3,741,614 | A | * | 6/1973 | Judge | 384/459 |
| 4,466,620 | A | * | 8/1984 | Orlowski | 277/412 |
| 4,586,717 | A | * | 5/1986 | Sweeney | 277/348 |
| 5,975,533 | A | * | 11/1999 | Hubbard et al. | 277/351 |
| 6,302,645 | B1 | * | 10/2001 | Kobayashi et al. | 415/172.1 |
| 7,059,827 | B1 | * | 6/2006 | Ingistov | 415/170.1 |
| 2002/0060432 | A1 | * | 5/2002 | Webster | 277/411 |
| 2004/0090013 | A1 | * | 5/2004 | Lawer et al. | 277/412 |
| 2004/0100029 | A1 | * | 5/2004 | Keller et al. | 277/346 |
| 2004/0119238 | A1 | * | 6/2004 | Skumawitz et al. | 277/412 |

* cited by examiner

*Primary Examiner*—Vishal Patel
(74) *Attorney, Agent, or Firm*—Lucas & Mercanti, LLP

(57) ABSTRACT

The invention relates to a seal with non-contact adjacent deflector rings, arranged concentrically to each other, about a common rotation axis, whereby, on a first deflector ring of the deflector rings, at least two axially-adjacent radial lips are embodied an said radial lips are embodied such as not to come into contact with a second deflector ring of the deflector rings and an annular hollow cavity is embodied between two axially-adjacent radial lips and the second deflector ring.

19 Claims, 3 Drawing Sheets

SEAL WITH NON-CONTACT ADJACENT DEFLECTOR RINGS

FIELD OF THE INVENTION

The invention relates to a seal with deflector rings which are arranged concentrically with respect to one another about a common axis of rotation and without contact with one another, at least two radial fins, which are axially adjacent to one another, being formed at a first deflector ring of the deflector rings, and the radial fins being arranged without contact with a second deflector ring of the deflector rings.

BACKGROUND OF THE INVENTION

A seal of this type is described in DE 100 80 61. The seal axially seals off a rolling bearing with respect to environmental influences which act on the rolling bearing in the axial direction. Two deflector rings, which engage radially inside one another, are arranged without contact with one another. Three radial fins which are axially adjacent to one another project from each deflector ring. Each of the radial fins engages radially between two of the radial fins, which are axially adjacent to one another, on the opposite deflector ring. The engagement is contact-free, with the result that the seal forms a labyrinth. On account of the labyrinth, the seal is axially open to the surrounding environment outside the seal or outside the bearing into the bearing. The arrangement of the deflector rings is selected in such a way that the seal is effective both with the shaft rotating and with the housing rotating.

Contact-free sealing systems seal off rolling bearing arrangements or similar systems with low power losses and with long-term operating reliability. The seal has to protect the system that is to be protected, for example a rolling bearing of a wheel bearing arrangement, against the penetration of foreign bodies from the surrounding environment and has to prevent lubricants from escaping from the system to the surrounding environment. In this context, the term surrounding environment is to be understood as meaning all the influences which act on the seal from the outside and against which a system, such as a rolling bearing, needs to be sealed by means of the seal. This may be the overall environment of the bearing (seal) or alternatively a mechanical system or the like mounted ahead of the seal.

The roles performed by modern contactless seals are mainly:

1. Shielding the entry region of the seal from being directly influenced by contamination, in particular from being splashed with liquids.

2. Deflecting

The seal must offer the smallest possible surface that can be attacked by contamination, in particular wetting. The build-up of liquids from the environment surrounding the seal in the immediate vicinity of the seal or at the seal is to be avoided.

3. Diverting

Keeping spray jets and contamination from the gap entry to the seal away from the seal by diverting them at the seal.

4. Flushing freely discharging or flushing away contaminants which come into contact with the seal, and flushing away the liquid returned from the seal.

5. Throttling narrow gaps at the seal reduce the through-flow quantity.

6. Trapping contamination as far as possible before it enters the seal or in the seal before it enters the system that has to be protected.

7. Returning dirt and collected liquid which have penetrated into the gaps of the seal.

8. blocking

For example against the penetration of liquid into the seal and against the escape of lubricants from the system.

The operational principles described above have been only partially realized in the prior art considered above.

SUMMARY OF THE INVENTION

At the time at which the invention was made, the object was to provide a seal which effectively implements all the operational principles described above.

This object is achieved by the invention. Accordingly, the seal has at least two deflector rings which are arranged concentrically with respect to one another about a common axis of rotation. The deflector rings are arranged without axial and radial contact with one another. At least two annular radial fins which are axially adjacent to one another are formed on the first of the deflector rings. The radial fins are either formed integrally with the deflector ring from a single material or are secured to the deflector ring. The radial fins are positioned freely opposite one another in the axial direction of the seal and at their bases on the deflector ring merge axially into one another to form a collection channel.

The deflector rings are formed from plastics or from elastomers, from combinations of the above-mentioned materials and are optionally reinforced, for example with sheet metal.

A cavity, which is radially closed off in one direction by the collection channel, is formed axially between the radial fins. The collection channel is delimited by the radial fins, which merge axially into one another at the deflector ring on which the radial fins are formed. In the other radial direction, the cavity, which is annular in form, is delimited by the other of the deflector rings. The cavity is not completely closed, but rather is accessible through radial annular gaps between the edges of the radial fins, which generally run around the axis of rotation, and the other deflector ring.

Each of the annular gaps leads either into a further cavity and optionally via a further collection channel of the seal. At least one of the annular gaps opens out axially into the environment surrounding the seal. It is preferable for at least two of the cavities/collection channels or annular gaps to be connected to one another and therefore to be functionally connected in series, in such a way that medium can pass through them, from the environment surrounding the seal to the inner side of the seal, and therefore into the interior of the system which is to be protected. In this context, it is conceivable both for the cavity/collection channels to be nested radially inside one another or to axially follow one another.

The radial fins are preferably fixed to a deflector ring which is secured to a shaft, a bearing ring or a journal and can rotate with the latter about the axis of rotation of the seal. The other deflector ring is seated in a housing or the like which at least partially surrounds the first deflector ring on the radially outer side. The first deflector ring can rotate about the axis of rotation relative to the second deflector ring.

The seal is axially delimited with respect to the surrounding environment by means of the deflector ring which is seated on the shaft, and the radial fin located furthest axially outward on the seal. In this arrangement, the seal is internally accessible through just one radial annular gap between the edge of the radial fin and the other deflector ring in the housing. Alternatively, the annular gap is formed radially between the edge of the radial fin and the housing itself. Accordingly, the seal is relatively well shielded in the axially outward direction (first operational principle—shielding).

The deflector ring which is seated on the shaft has a surface that is as smooth as possible on its axial front end facing the surrounding environment and merges gently in the radial direction into a projection via an encircling bevel. The projection is designed to run all the way around and, near to the annular gap, is mounted ahead of the annular gap from the axis of rotation. Splash water which strikes the axial front end of the seal is initially guided radially outward by the centrifugal force, is at least partially guided axially away from the annular gap at the bevel and is flushed out in this direction at the projection (second operational principle—deflecting, third operational principle—diverting, fourth operational principle—flushing away).

At an axially outer side of the seal, the annular gap opens out freely into the environment axially surrounding the seal (seventh operational principle—returning). Alternatively, a collection channel is arranged upstream of the annular gap leading into a cavity. The collection channel is open toward the environment surrounding the seal via a relatively large radial air gap and is designed, for example, so as to have a stationary action in the deflector ring on the housing (sixth operational principle—trapping).

The cavities are shaped voluminously so that liquids which have penetrated into the seal as contamination are trapped in the collection channels and are passed back to the surrounding environment through the annular gaps and over the radial fins as well as via gravitational or centrifugal forces. The clear radial height of each of the cavities or at least one of the cavities preferably corresponds to 1.4 times the maximum clear axial distance between the radial fins delimiting this cavity (sixth operational principle—trapping).

The radial dimensions of the annular gaps are kept as small as possible and are preferably in a range from 0.1 mm to 1.0 mm (fifth operational principle—throttling).

A guide system, which is used to discharge liquid/contamination which has penetrated into the seal back out of the seal, with the assistance of the centrifugal forces and/or gravitational forces, is formed on a seal having at least two of the cavities (seventh operational principle—returning). To this end, the seal is alternatively configured with the following design features:

the radial fin arranged on the seal furthest axially outward in the direction of the surrounding environment is radially longer than a second radial fin, located axially opposite this radial fin at the cavity, in the interior of the seal. The radially longer first radial fin generally at least partially closes off the seal from the environment surrounding the seal at the axial front end. A further radial fin which optionally axially follows this second radial fin at a further cavity is in turn radially shorter than the second radial fin, etc.

The second deflector ring, which surrounds the first deflector ring on the outer side, has a continuously smooth inner lateral surface which radially faces the first deflector ring. This inner lateral surface engages around the radial fins on the outer side. The radial distance from this inner lateral surface to the axis of rotation increases with decreasing distance to the environment area surrounding the bearing, i.e. decreasing distance from the outer front end of the seal. Such an inner lateral surface can be found on the inside of a cone.

Each of the radial fins, at its axial flank facing the interior of the seal, is inclined in such a way with respect to the axis of rotation that the axial distance between the annular surface at the flank and between the adjacent radial fin located axially opposite at the cavity increases at increasing radial proximity to the second deflector ring. The collection channel between the adjacent fins accordingly widens in the axial direction at increasing radial distance from the axis of rotation. The annular surface is preferably inclined at an angle of 70° to 85° with respect to the axis of rotation and furthermore is curved in such a way at the edge of the radial fin that the edge is beveled or rounded from the cavity in the direction of the annular gap. The flank of the opposite radial fin is preferably oriented perpendicular to the axis of rotation.

The radial dimension of the annular gap (gap width) which opens out into the surrounding environment is smaller than the radial dimension of the annular gap which follows it in the seal. The gap dimension of an annular gap which follows it in turn is larger than that of any subsequent annular gap which may follow it in the axial direction.

The annular gap which opens out into the surrounding environment runs around the axis of rotation further away from the axis of rotation than the following annular gap. The following annular gap is in turn further away from the axis of rotation than the next annular gap in the axial direction.

A further configuration of the invention provides for one of the annular gaps, starting from a cavity, to first run radially between a radial fin and the second deflector ring, and then to continue on a curved path in the shape of an arc in the direction of the axis of rotation. This annular gap runs between the radial fin and the second deflector ring. Finally, the annular gap continues radially in the direction of the axis of rotation at a side of the radial fin which is axially remote from the cavity, axially between the radial fin and the second deflector ring (fifth operational principle—throttling).

The second deflector ring in this case at least partially delimits the seal on the inner side, at a side remote from the environment surrounding the seal in the axial direction, and engages axially behind the first deflector ring without contact. The annular gap which has been diverted in the radial direction leads to a third cavity in the seal. The third cavity is enclosed at least by the first deflector ring and by the second deflector ring (sixth operational principle—trapping).

The third annular gap opens out into the cavity, which is provided as a further collector for liquids which have penetrated into the seal and from which the contamination is in turn to be released again to the surrounding environment via the preceding collection channels and/or annular gaps. Alternatively, the gap opens out radially into the third cavity via a collection channel which runs around the axis of rotation. The collection channel is formed at the second deflector ring. In one configuration of the collection channel, it is provided that the collection channel is delimited radially and in an axial direction by a fin which starts from the second deflector ring and runs around the axis of rotation. The fin preferably rises, starting from the second deflector ring, initially with an angle of inclination of $\geqq 15°$ away from the axis of rotation, and its further profile is then bent away from the axis of rotation at a larger angle than the initial angle of inclination (sixth operational principle—trapping).

The deflector rings are preferably made from plastic, but may alternatively be formed from metals, elastomers or a composite comprising the above-mentioned materials. The collection channel is preferably made from elastomers or from a composite material comprising elastomers.

In a further configuration of the invention, it is provided that a contacting seal adjoins the seal according to the invention (eighth operational principle—blocking). The contacting seal starts from the second deflector ring and has at least one elastic sealing lip. The sealing lip is radially prestressed against a shaft or a bearing ring. The sealing lip, preferably at the edge of the sealing lip, is at least 2.5 times as long as the sealing lip is thick at the thickest point of the sealing lip. The sealing lip is preferably formed from an elastomer or from a composite of elastomers.

The operational principles of the seal are realized by the interaction of centrifugal forces with the force of gravity and with the guidance system/throttling system of the seal. Since the sealing elements (deflector rings) are arranged without radial and axial contact with one another, the seal is advantageously of low-friction and low-wear design compared to contacting seals.

DESCRIPTION OF THE DRAWINGS

The invention is explained in more detail below on the basis of exemplary embodiments.

Figure 1:
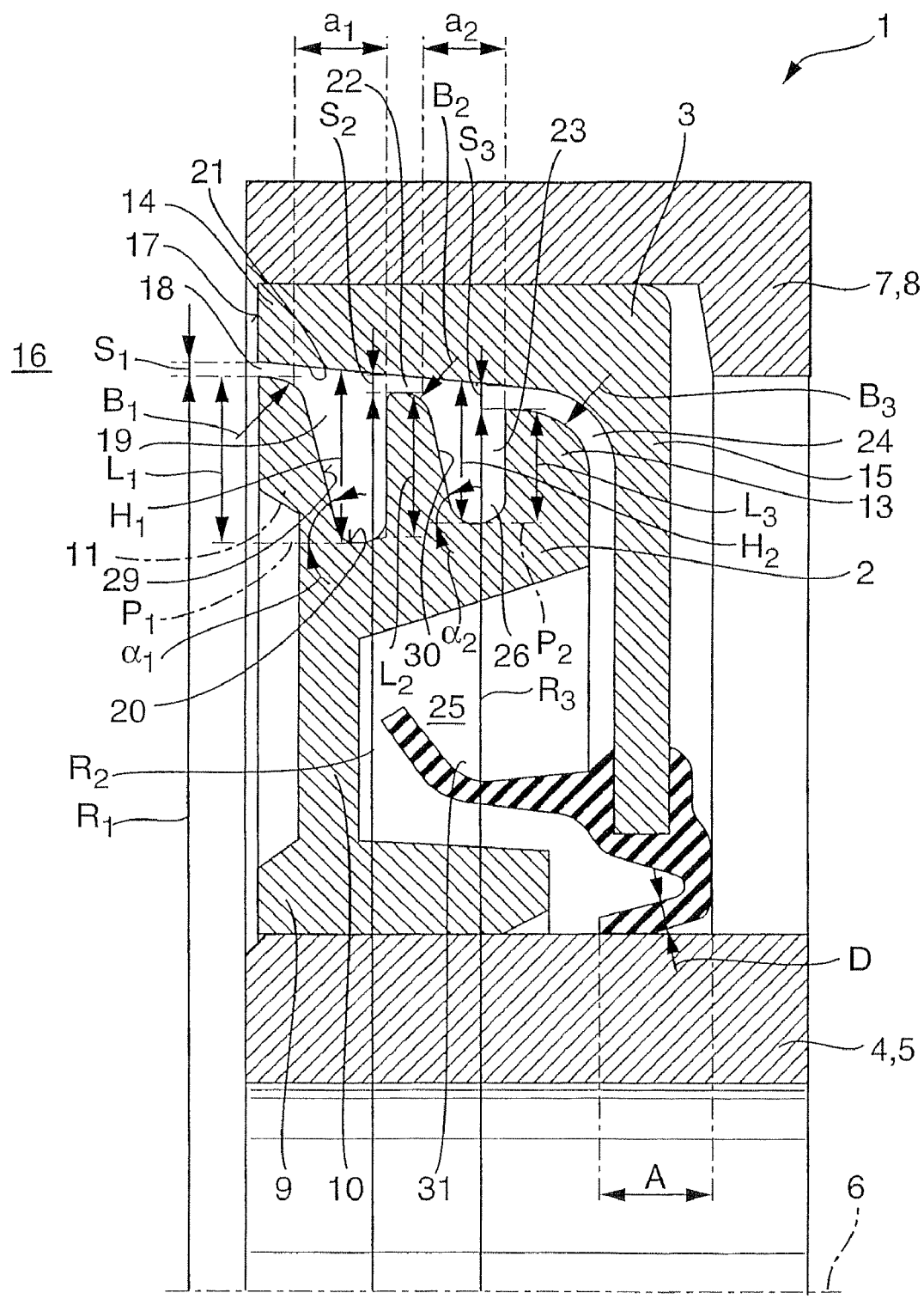
FIG. 1 to FIG. 3 show exemplary embodiments of the seal according to the invention on the basis of partial sections longitudinally along the axis of rotation of the corresponding seal.
Figure 1A:
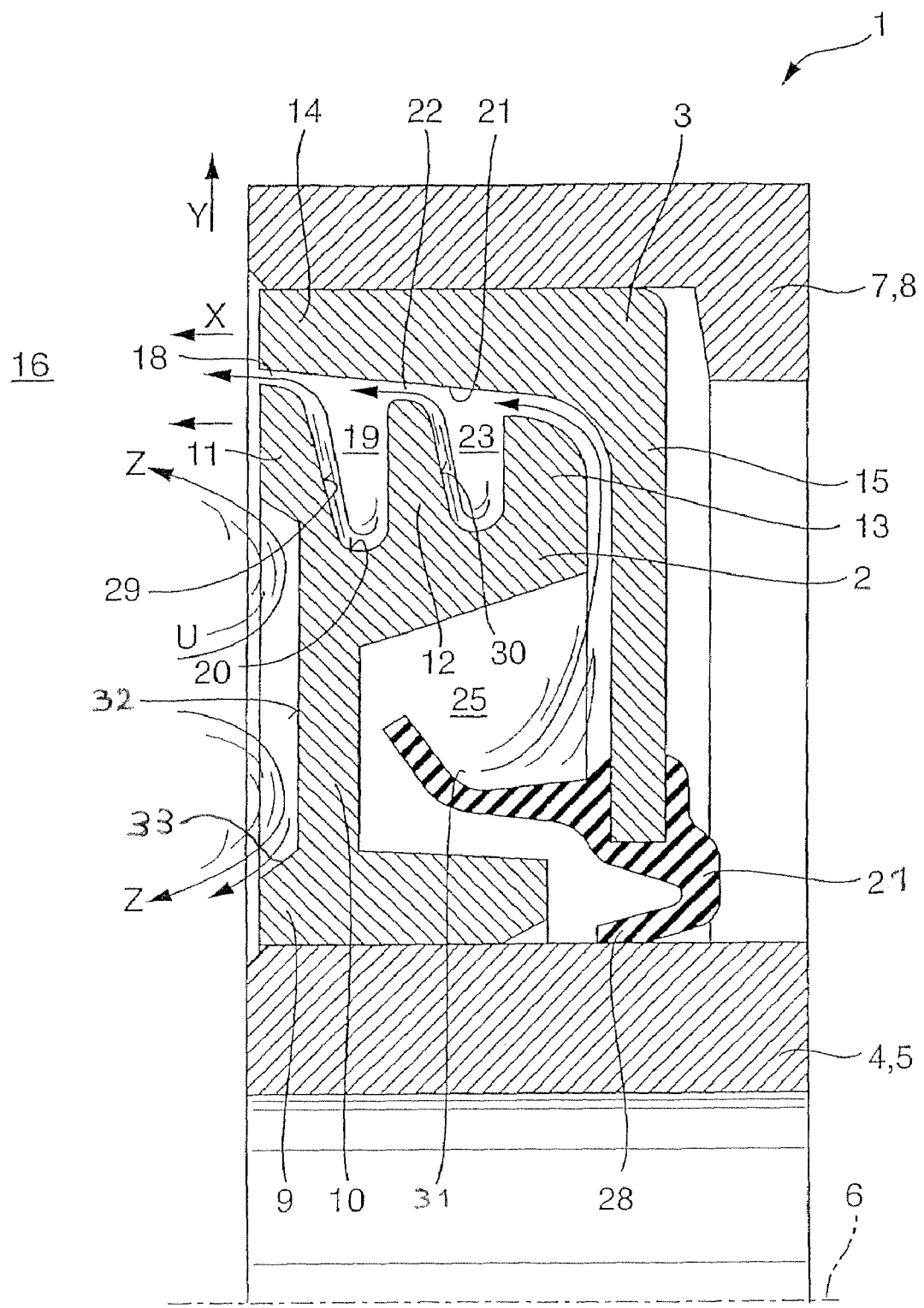

The seal 1 shown in FIG. 1 and Figure 1a has two deflector rings 2 and 3. The deflector ring 2 is seated on a shaft 4 or on a bearing ring 5 and can rotate with the shaft 4 about the axis of rotation 6. The deflector ring 3 engages around the deflector ring 2 on the radially outer side and is seated in a housing 7 or in a bearing ring 8.

The deflector ring 2 is formed as a single part comprising a hub 9, a web 10 and the radial fins 11, 12 and 13. In the longitudinal section illustrated, the deflector ring 3 is of L-shaped design, with one of the limbs 14 of the deflector ring 3 engaging around the radial fins 11, 12 and 13 and the other limb 15 being angled off radially from the limb 14 in the direction of the axis of rotation 6.

At the axial front end, the seal 1 is closed off from the surrounding environment 16 by means of the deflector ring 2 and the front end 17 of the deflector ring 3, so that it is only accessible via the annular gap 18. The annular gap 18 merges axially into a cavity 19. The cavity 19 is delimited in the axial direction by the radial fins 11 and 12 and in the radial direction by the collection channel 20 and the inner lateral surface 21 on the deflector ring 3. The annular gap 22 is formed between the radial fin 12 and the inner lateral surface 21. The annular gap 22 connects the cavity 19 to a cavity 23. The cavity 23 merges from the collection channel 26 into an annular gap 24. The annular gap 24, between the radial fin 13 and the deflector ring 3, opens out radially into a cavity 25 via a collection channel 31. The collection channel 31 is delimited by a transverse fin 59 which runs around the axis of rotation 6. The transverse fin 59 is produced from a different material than the second deflector ring 3 and is fixed to the latter.

The differences in size between the gap dimensions $S_1$, $S_2$ and $S_3$ at the annular gaps 18, 22, 24 are $S_3 > S_2 > S_1$. The differences in size between the distances $R_1$, $R_2$ and $R_3$ between the annular gaps 18, 22, 24 and the axis of rotation 6 are $R_1 > R_2 > R_3$. The differences in size between the radial lengths $l_1$, $l_2$ and $l_3$ of radial fins 11, 12 and 13 are $l_1 > l_2 > l_3$. The largest clear radial distances $H_1$ and $H_2$ are in each case at least 1.4 times the largest clear radial distances $a_1$ and $a_2$. The angle included between the annular surfaces 29 or 30 and the respective parallels $P_1$ or $P_2$ to the axis of rotation 6 is 70° > $\alpha_1$ and $\alpha_2 < 85°$. The geometric center of each of the annular surfaces which lie opposite the annular surfaces 29 and 30 and which are formed on the radial fins 12 and 13 in this case has the axis of rotation 6 passing perpendicularly through it.

The radial fins 11 and 12 are rounded with radii $B_1$ and $B_2$, respectively, starting from the annular surfaces 29 and 30 toward the annular gaps 18 and 22, respectively. The radial fin 13 is rounded with the radius $B_3$ at a side facing the deflector ring.

A seal 27, which is prestressed against the shaft 4 by way of a sealing lip 28, is formed at the deflector ring 3. The ratio of the length A of the sealing lip 28 to the thickest membrane thickness D is 2.5 to 1.

The operational principles of the seal 1 are described in FIG. 1a. The seal 1 has a shielding action in the arrow directions denoted by X. Spray liquid which strikes the seal 1 is deflected in the directions described by arrows X and Y. The spray water is diverted or flushed away in the arrow directions denoted by U and Z. The passage of the liquid is throttled at the annular gaps 18, 22 and 24. The liquid and the dirt are trapped in the cavities 19, 23 and 25 and by means of the collection channels 20, 26 and 31. The centrifugal force which acts in direction Y and is generated by the rotating deflector ring 2 passes splash water radially outward, then via the annular gap 24, then along the deflector ring 3, which is of internally conical design with the inner lateral surface 21, via the annular gaps 18 and 22 and then finally back into the surrounding environment 16. Splash water which strikes the front end of the seal 1 is diverted in the Z directions in the axial recess 32 at the deflection surface 33 and flushed away in the Z directions.

Figure 2:
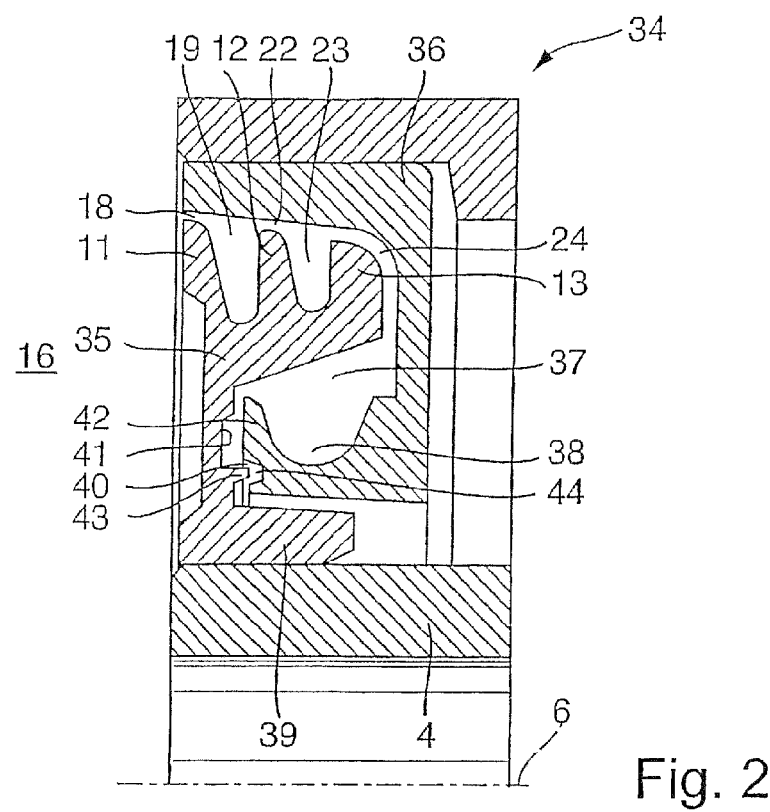

FIG. 2 shows an exemplary embodiment of a seal 34 with a deflector ring 35, which is seated on the shaft 4, and with a deflector ring 36, which engages around the deflector ring 35 on the radially outer side. The radial fins 11, 12 and 13 are formed on the deflector ring 35. The cavities 19 and 23 are formed between the deflector rings 35 and 36 and connected to one another via the annular gap 22. The annular gap 24 leads into a cavity 37 which is formed radially between the axis of rotation 6 and the radial fins 12 and 13. The cavity 37 is delimited by a collection channel 38 radially toward the axis of rotation 6.

The collection channel 38 has been introduced into the deflector ring 35 and is formed radially at least between the cavity 23 and a hub 39 at the deflector ring 35. The deflector ring 36 engages behind the deflector ring 35 in such a manner that an annular gap 40 with varying gap dimensions is formed axially and radially between the deflector rings 35 and 36. An axial groove 41, which lies axially opposite the flank 42 at the collection channel 38, is formed on the deflector ring 35. An annular projection 43 projects axially from the deflector ring 35 in the direction of the deflector ring 36. The projection 43 at least partially engages axially, without contact, in an axial groove 44 formed at the deflector ring 36. The axial grooves 41 and 44 and the annular gap 40 are optionally filled with grease.

Figure 3:
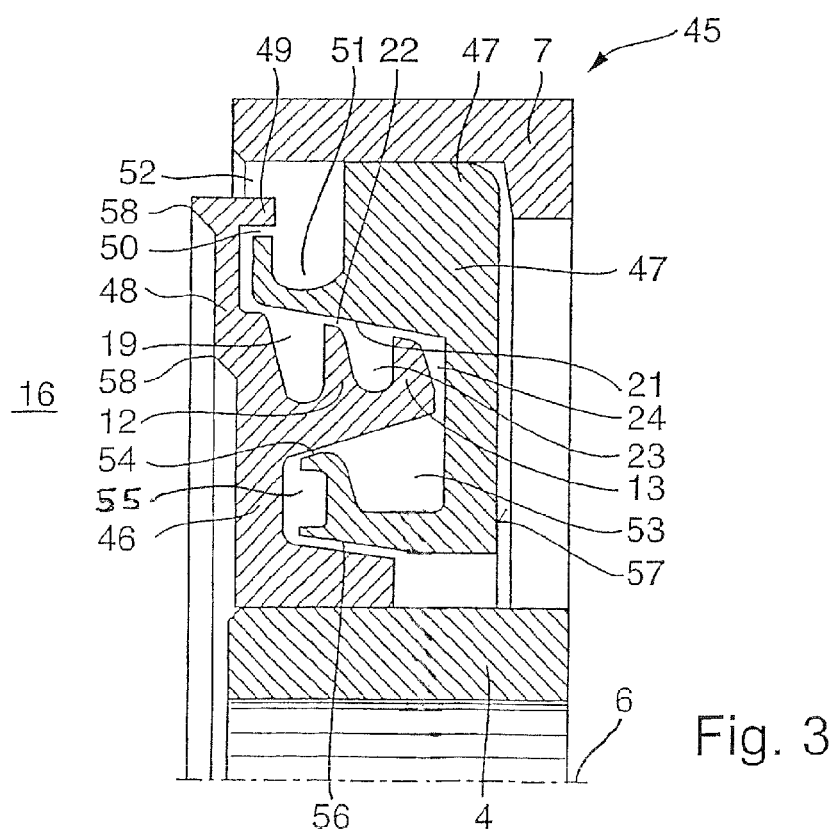

FIG. 3 shows a seal 45 with a deflector ring 46 and a deflector ring 47. The deflector ring 46 is seated on the shaft 4 and the deflector ring 47 is seated in the housing 7. A radial fin 48, which at least partially delimits the seal 45 on the axially outer side, is formed on the deflector ring 46. The radial fin 48 has an axial extension 49 which partially engages around the deflector ring 47 in the radial direction. An annular gap 50, which opens out axially into a collection channel 51, is formed between the radial fin 48 and the deflector ring 47. The collection channel 51 is formed at the deflector ring 47 and is open to the surrounding environment 16 via the gap 52.

The annular gap 50 leads into the cavity 19. The cavity 19 is delimited on the radially outer side by the inner lateral surface 21 at the deflector ring 47 and is connected to the cavity 23 via the annular gap 22. The annular gap 24 leads from the cavity 23 into a cavity 53. The cavity 53 is delimited in both axial directions and also radially in the direction of the axis of rotation 6 by the deflector ring 47 and in the radially outward direction is at least partially delimited by the deflector ring 46. The cavity 53 is connected to a further cavity 55 via the annular gap 54. From the cavity 55, an annular gap 56 faces toward the system-side end 57 of the seal 45. The end of the seal 45 facing the surrounding environment is provided with detachment edge 58. The detachment edge 58 is mounted radially ahead of the gap 52 from the direction of the axis of rotation.

LIST OF DESIGNATIONS

1 Seal
2 Deflector ring
3 Deflector ring
4 Shaft
5 Bearing ring
6 Axis of rotation
7 Housing
8 Bearing ring
9 Hub
10 Web
11 Radial fin
12 Radial fin
13 Radial fin
14 Limb
15 Limb
16 Surrounding environment
17 Front end
18 Annular gap
19 Cavity
20 Collection channel
21 Inner lateral surface
22 Annular gap
23 Cavity
24 Annular gap
25 Cavity
26 Collection channel
27 Seal
28 Sealing lip
29 Annular surface
30 Annular surface
31 Collection channel
32 Recess
33 Diverting surface
34 Seal
35 Deflector ring
36 Deflector ring
37 Cavity
38 Collection channel
39 Hub
40 Annular gap
41 Axial groove
42 Flank
43 Projection
44 Axial groove
45 Seal
46 Deflector ring
47 Deflector ring
48 Radial fin
49 Extension
50 Annular gap
51 Collection channel
52 Gap
53 Cavity
54 Annular gap
55 Cavity
56 Annular gap
57 Front end
58 Detachment edge

The invention claimed is:

1. A seal, comprising:
a first deflector ring concentrically arranged inside a second deflector ring and about a common axis of rotation;
two radial fins formed on the first deflector ring, extending radial outward towards the second deflector ring without contacting the second deflector ring;
a smooth, outwardly conical, inner lateral surface formed on the second deflector ring, radially opposing the two radial fins;
a first collection channel delimited axially by the two radial fins and radially by the first dellector ring;
a first annular cavity delimited axially by the two radial fins and delimited radially by the First collection channel and the inner lateral surface;
a second collection channel delimited by a transverse fin extending axially from an inward radial limb of the second deflector ring, the inward radial limb axially inward of the first deflector ring, the second collection channel radially inward of the first collection channel and the two radial fins; and
at least one seal with at least one elastic sealing lip starting from the inward radial limb of the second deflector ring, the sealing lip being radially prestressed against a shaft.

2. The seal as claimed in claim 1, wherein the sealing lip is arranged axially next to the first deflector ring, which is seated on the shaft and delimits the seal on the axially outer side.

3. The seal as claimed in claim 1, wherein the sealing lip is at least 2.5 times as long as the sealing lip is thick at a thickest point transversely with respect to this length.

4. A seal for an annular opening between members, the seal comprising:
a first deflector ring concentrically arranged inside a second deflector ring and about a common axis of rotation;
two radial fins formed on the first deflector ring, extending radial outward towards the second deflector ring without contacting the second deflector ring;
a smooth, outwardly conical, inner lateral surface formed on the second deflector ring, radially opposing the two radial fins;
a first collection channel delimited axially by the two radial fins and radially by the first deflector ring;
a first annular cavity delimited axially by the two radial fins and delimited radially by the first collection channel and the inner lateral surface;
a second collection channel delimited by a transverse fin extending axially from an inward radial limb of the second deflector ring, the inward radial limb axially inward of the first deflector ring, the second collection channel radially inward of the first collection channel and the two radial fins;
the first annular cavity merges axially into a first radial annular gap formed between a first radial fin of the two radial fins and the second deflector ring, and into a second radial annular gap formed between a second radial fin of the two radial fins and the second deflector ring;

a third radial fin formed on the first deflector ring and spaced axially opposite the second radial fin;

a second annular cavity formed axially between the second radial fin and the third radial fin; and the second annular cavity merges axially into the second radial annular gap and into a third radial annular gap between the third radial fin and the second deflector ring.

5. The seal as claimed in claim 4, wherein the first annular cavity has a radially innermost bottom whose radial distance to the second deflector ring is at least 1.4 times the axial distance between the two radial fins that delimit the first annular cavity.

6. The seal as claimed in claim 4, wherein the first radial fin is arranged further axially outward than the second radial fin and at least partially closes off the seal with respect to an environment surrounding the seal in an axial direction which is radially longer than the second radial fin.

7. The seal as claimed in claim 6, wherein the radial distance between an inner lateral surface, facing the first deflector ring, of the second deflector ring and the axis of rotation increases as the axial proximity to the surrounding environment decreases, the inner lateral surface at least partially engaging radially around the radial fins and the first cavity.

8. The seal as claimed in claim 4, wherein the first annular cavity is delimited by annular surfaces that radially increase in distance from one another towards the second deflector ring.

9. The seal as claimed in claim 8, wherein the annular surfaces are inclined at an angle from 70° to 85° with respect to the axis of rotation.

10. The seal as claimed in claim 4, wherein the first radial annular gap on an axially outer side of the first radial fin opens out freely into an environment axially surrounding the seal.

11. The seal as claimed in claim 4, wherein the first radial annular gap is radially narrower than the second radial annular gap.

12. The seal as claimed in claim 4, wherein the second radial annular gap runs radially closer to the axis of rotation than the first radial annular gap.

13. The seal as claimed in claim 4, wherein the first annular gap opens out axially into a radial first collection channel, which runs around the axis of rotation, in the second deflector ring, and the first collection channel is open toward the environment axially surrounding the seal.

14. The seal as claimed in claim 4, wherein the first radial annular gap is radially narrower than the second radial annular gap, and in that the second radial annular gap is radially narrower than the third radial annular gap.

15. The seal as claimed in claim 4, wherein the first radial annular gap is further away from the axis of rotation in a radial direction than the second radial annular gap, and in that the second radial annular gap is further away from the axis of rotation in the radial direction than the third radial annular gap at its radially narrowest point.

16. The seal as claimed in claim 4, wherein the first radial fin is radially longer than the second radial fin, and in that the second radial fin is radially longer than the third radial fin.

17. The seal as claimed in claim 4, wherein the third radial annular gap, starting from the second annular cavity, runs initially radially between the third radial tin and the second deflector ring and then runs onward, towards the axis of rotation, on a curved path between the third radial fin and the second deflector ring, and finally, on a side of the third radial fin which is axially remote from the second radial fin, is formed axially between the third radial fin and the second deflector ring.

18. The seal as claimed in claim 4, wherein the third radial annular gap, starting from the second annular cavity, leads to a third annular cavity in the seal, the third cavity being enclosed at least by the first deflector ring and by the second deflector ring.

19. The seal as claimed in claim 4, wherein the third radial annular gap runs out in the radial direction via the second collection channel.

* * * * *